June 9, 1964 G. CAPOWICH ETAL 3,136,369
BLADE TIP SEALING MEANS
Filed Oct. 18, 1962

INVENTORS
GEORGE CAPOWICH
PIERCE A. MECK
BY Jack N. McCarthy
AGENT

United States Patent Office 3,136,369
Patented June 9, 1964

3,136,369
BLADE TIP SEALING MEANS
George Capowich, Shelton, Conn., and Pierce A. Meck, South Salem, N.Y., assignors to United Aircraft Corporation, East Hartford, Conn., a corporation of Delaware
Filed Oct. 18, 1962, Ser. No. 231,395
18 Claims. (Cl. 170—159)

This invention relates to a method for sealing the tip end of a supporting spar of a rotor blade so that it can be pressurized.

An object of this invention is to provide a method for sealing a blade at its tip end with a minimum of change to the blade.

Another object of this invention is to provide a method for sealing the tip end of a rotating blade which will affect the flight characteristics of the blade to a minimum.

A further object of this invention is to provide a method of sealing the tip end of a blade spar so that the interior of the blade can maintain either a pressure or a vacuum.

Another object of this invention is to provide a method for sealing a blade spar in which the sealing dam formed comprises a compound which has been cured to adhere as one piece to parts of the dam and the spar to prevent leakage past the dam.

These and other objects and advantages will be apparent from the specification and claims and from the accompanying drawings which illustrate an embodiment of the invention.

Figure 1:
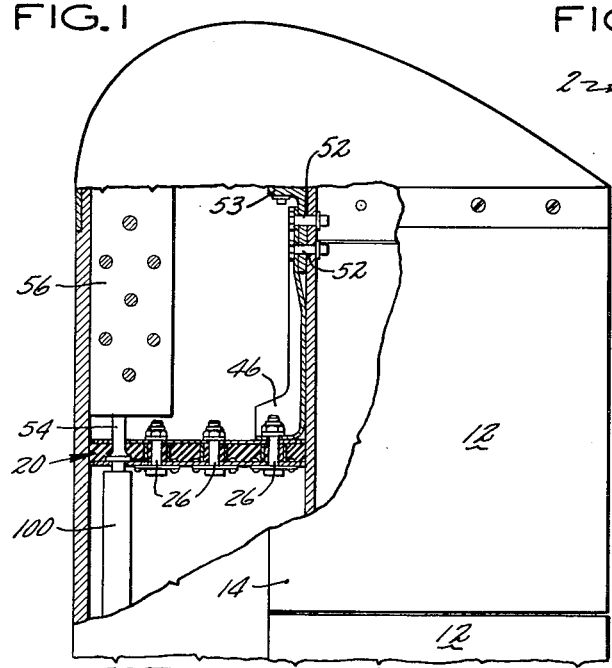
FIGURE 1 is a view of a rotor blade positioned vertically with a section removed to show the root and tip ends.
Figure 4:
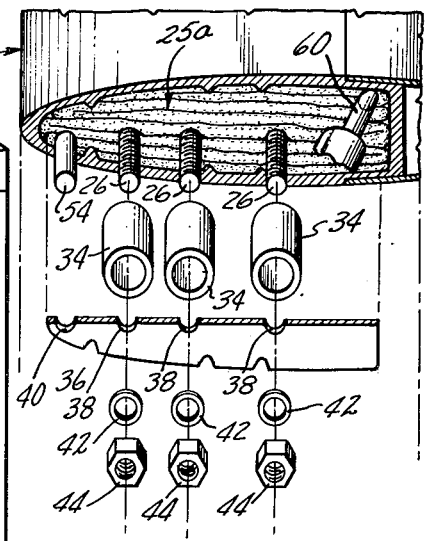
FIGURE 4 is an enlarged, exploded perspective view of the sealing unit showing the compound in layers.
Figure 2:
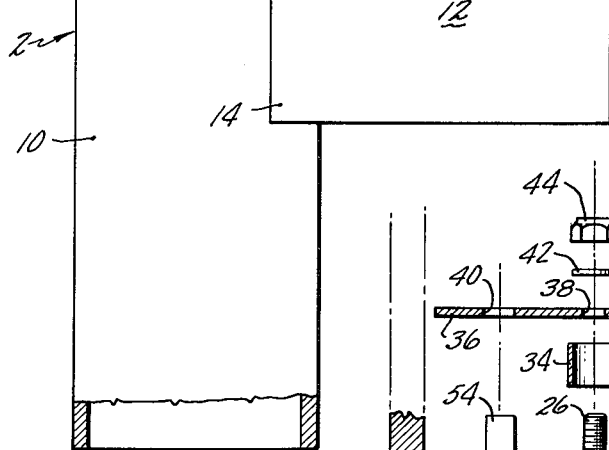
FIGURE 2 is an enlarged, exploded view showing the internal parts of the sealing unit.
Figure 2:
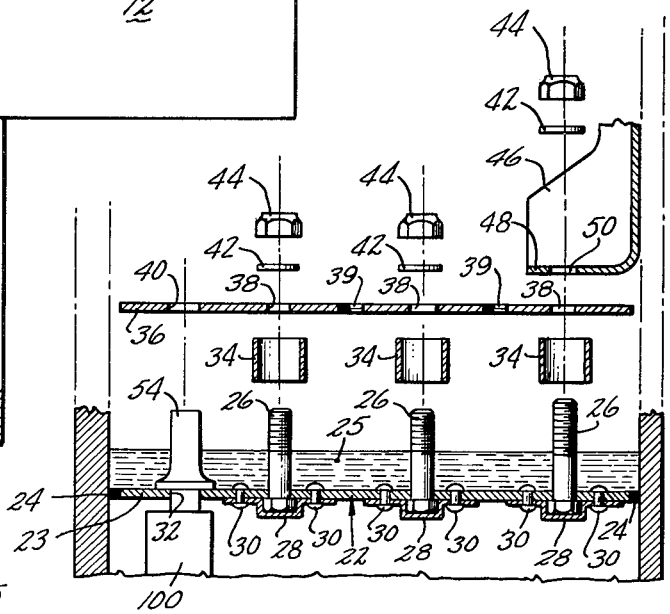
Figure 3:
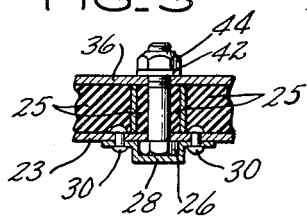
FIGURE 3 is a fragmentary, detailed view of one of the clamping members.

As viewed in FIGURE 1, the rotor blade 2 comprises essentially an extruded metal spar 10 which extends from the root to the tip end of the blade which comprises the main structural member as well as the leading edge portion of the blade. While metal has been mentioned, it is to be understood that other material, such as Fiberglas, can be used. The spar forms a substantial chordwise portion of the blade and conforms to the airfoil contour. The remainder of the chordwise extent of the blade is made up of V-shaped sheet metal pockets or boxes 12, the upper and lower forward edges 14 of which are adhesively bonded to the upper and lower aft edges of the spar. Blades of the type described can have a weight, or weights, 100 positioned in the spar for blade balance, guided by spanwise beads on the upper and lower inner surfaces of the spar. Blades of this type are shown in U.S. Patent No. 2,754,917 and U.S. Patent No. 2,754,918. While a specific blade structure has been described, it has been done so to provide an environment for the blade sealing method which may be used with other types of blades.

The blade sealing method to be described in this application involves the use of parts which are positioned in one end of a blade spar in a new and novel manner to seal the spar at a particular location. The sealing means or dam 20 is formed including the following parts:

(1) An inboard plate assembly 22 which comprises a plate 23 having an outside contour slightly less than the inside contour of the spar, said plate having around its outer edge a bead of cured elastomeric material 24, which makes the plate assembly contour a little greater than the inside contour of the spar. This plate 23 has three bolts 26 fixed thereto which extend through said plate from one side thereof. Each bolt 26 is held in position by cap member 28 which fits over the head of the bolt and holds it against rotation and axial movement. Each cap member 28 is fixed to the plate 23 by rivets 30. For a blade having balancing weights 100, a hole 32 is provided;

(2) A bushing 34 is provided for each bolt 26 and has its inner diameter made larger than the diameter of the bolt. The bushing is of such a size to permit a substantial annular space between each bolt and its bushing;

(3) An outboard plate 36 is provided which has three holes 38, one each for the bolts 26. A hole 40 is also provided in the event a blade is being sealed having balancing weights 100. The outboard plate also has two threaded holes 39 for a purpose to be hereinafter described. The plate 36 has an outside contour which is slightly less than the inside contour of the spar;

(4) Washers 42 and nuts 44 are provided for each of the bolts 26;

(5) A positioning bracket 46 is provided to extend inwardly from the tip end of the blade. A flange 48 on its inboard end has an opening 50 to be placed over the bolt 26 before the cooperating washer 42 and nut 44 are placed thereon. The outer end of the bracket 46 is fixed to the spar by two bolts 52. The bracket 53 is used for a tip balancing means, not part of this invention;

(6) For a blade having tip weights 100, a force transmitting member 54 is provided. One end of the member 54 has a flange which is adapted to engage the plate 23 while another portion is adapted to project through opening 32 in a press fit with the plate to engage the outboard end of the weights 100. The other end of the member 54 is adapted to extend through the opening 40 in the outer plate 36 and engage a filler or retaining block 56. This block is fixed in place by a plurality of rivets extending through rivet holes in the spar;

(7) When a blade is used which does not have weights, a second bracket 46 can be used in the forward part of the blade;

(8) A predetermined amount of an elastomeric sealer 25 having a low permeability, or low rate of diffusion, for the fluid to be contained, when it is in a cured state; and (9) A primer when required for increasing the effectiveness of the bond between the sealer and blade spar and other dam parts. The requirement for a primer with a sealer can usually be obtained from the sealer manufacturer.

The bushings 34 and the inboard side of the plate 36 should be coated with a release agent, such as Teflon, for preventing the sealant from adhering thereto when a sealer or sealant is used having a relatively large percentage of shrinkage. This will prevent a tear in the cured sealer by permitting the sealer to move way from the inboard side of the plate 36 and also slide around the bushings 34 towards the plate 23.

The parts set forth above are assembled in the following manner:

The blade 2, comprising the metal spar 10 and the V-shaped metal pockets 12, is positioned so as to receive an inboard plate assembly 22. Two extension arms, not shown, each having an internally threaded end member are threadably connected to the outer bolts 26 so that an operator holding the free ends of the two arms can place the plate assembly 22 in the spar while maintaining it parallel to a chordline of the blade. This aids in preventing the bead of compound 24 from being torn away from the edge of the plate 23. When inspection insures that the plate assembly fits snugly around its entire periphery, the inboard plate assembly 22 is removed. With the assembly in position, a light can be placed on one side of the assembly, and if no light can be seen around the edge of the assembly from the other side, a snug fit is indicated. The seal area of the spar cavity and the inboard plate assembly is cleaned to receive a sealer. This includes the bolts 26 and member 54 if one is used. For some sealers, a coat of primer is applied thereto. A second coat of primer can be added to insure complete coverage. The primer is used for some sealers to insure a uniform and strong bond between the spar and the sealer to be used as mentioned above. For example, one elastomeric sealer which has low permeability is known as EC-2181 B/A, manufactured by Minnesota Mining and Manufacturing Company, St. Paul, Minnesota. When this sealer is used in an aluminum spar, a primer which they also manufacture, EC-1945 B/A, should be used. However, when their elastomeric sealer, EC-1675 B/A, is used, no primer is necessary.

When a primer is used, it is permitted to cure before the sealing compound is placed against it. Heating elements are then positioned on the blade to heat the area around the plate assembly. Insulating material is placed around the heating elements to retain the heat against the outer surface of the spar. This insulation can be of a blanket type wrapped around the blade and elements, and tied at the upper and lower ends to prevent heat loss.

The plate assembly 22 is now placed in position in the spar by the use of the two extension arms, maintaining it parallel to a chordline of the blade during the entire operation. The steps to this point can be done with a blade in a vertical or horizontal position. However, it is necessary that the blade is in a vertical position with the tip end up so that the following steps can take place. The heating elements on the blade are placed in an "on" position to preheat the blade spar to provide a temperature at which the sealer can be easily worked. When EC-2181 B/A was used, the elements were set to provide a temperature of approximately 120° F. for the installation of the remainder of the seal.

The sealing compound, in a state capable of flowing, is placed in the tip end of the blade to fill the spar above the plate assembly 22 with the required amount of sealant. A heavy bead or edge of sealant is placed around the periphery of the plate assembly 22 which contacts the spar, when this has been done the sealant is then added to the center of the assembly. This is done by the use of a gun having a nozzle for directing the flow of sealant therefrom and a cartridge for receiving the proper amount of sealant.

The amount of sealant required is an amount which will more than fill the space enclosed by the plates 23 and 36 and spar 10 when the plates are assembled. In determining this space, the volume of any parts between the plates 23 and 36 must be taken into consideration as must the length of the bushings 34.

A bushing 34 is centered over each bolt 26 and is permitted to rest on top of the sealant compound. By its own weight, it moves downwardly through the compound until it seats on the bottom of the plate assembly 22. A short period of time is allowed to permit air which may have been trapped in the sealant to rise to the surface.

Two extension arms, not shown, each having an externally threaded end are threadably connected to the two holes 39 in the outboard plate 36 so that an operator holding the free ends of the two arms can place the plate 36 in the spar while maintaining it parallel to a chordline of the blade. The bracket 46 is then put in place with the opening 50 placed over the end bolt 26. The washers 42 and nuts 44 are then placed on each of the bolts 26. The nuts are then torqued into their proper position. After plate 36 is drawn into its final position, the sealer or sealant will squeeze out from between the plates around the edge of the plate 36 and the spar 10. The amount squeezed out will be the amount which is more than that necessary to fill the space enclosed by the plates 23 and 36 and spar 10 assembled. The outer end of the bracket is then bolted to the spar by the bolts 52. If no sealant is squeezed out, the installer knows that the sealant is leaking by the inboard plate assembly.

Place a test block 56 in the outboard end of the spar so as to abut the outboard end of the member 54. This is done to fix the sealing means or dam 20 in its final position. The sealer is then permitted to cure until a strength is obtained which will maintain a selected fluid pressure within the spar. A dam in an aluminum spar formed using EC-2181 B/A with primer EC-1945 B/A, was heated at a temperature of 350° F. for approximately one hour to obtain a durometer hardness of 45 which provided the proper curing. As will be apparent to one versed in this art, other combinations of a temperature and a time limit can operate as well. The pressure is kept at a value which will not distort the section of the spar.

In testing the aluminum spar just referred to having a dam 20 therein for seal efficiency, Freon was used and as stated hereinbefore, the dam had been formed using EC-2181 B/A which had the primer EC-1945 B/A applied first. It is to be understood that the root end of the spar is sealed so that the tip end seal or dam forms a sealed chamber therewith. It was placed in the spar under a pressure of approximately 25 p.s.i. and a leak detector was used to check the dam. Since Freon is corrosive to aluminum; dry air and nitrogen have been used to pressurize aluminum spars of blades for long periods of time. For blades which have been made having an extruded aluminum spar, a pressure of approximately 10 p.s.i. has been used for regular flight.

The method above can be completed in the following manner from just before placing the blade in a vertical position if the blade has been in a horizontal position. This permits the blade to be kept in a horizontal position throughout the entire process.

The sealing compound is placed in the tip end of the blade by a gun having a nozzle 60 which places a bead 25a of sealant along the length of the bottom of the spar against the inner plate, and then places another bead atop the first bead for the length of the spar, and this is continued until the top of the spar is reached. The bolts 26 and member 54 worked around keeping the bead close thereto. During this operation the sealant must be kept in a state so that its viscosity will not permit it to flow out of its beaded state by itself for several minutes. The amount of sealant required is the same as before.

A bushing 34 is centered over each bolt 26 and an outboard plate is installed as before except the plate pushes the bushings 34 into the sealant. The seal is completed as before.

It is to be understood that the invention is not limited to the specific description above or to the specific figures, but may be used in other ways without departure from its spirit as defined by the following claims.

We claim:

1. A method of sealing one end of a hollow spar for a helicopter rotor blade comprising the steps of:
    (a) inserting a first plate into said spar having an outer edge which snugly engages said spar;
    (b) placing a predetermined amount of uncured sealing compound into said blade end;
    (c) placing spacing means in said compound;
    (d) placing a second plate in said spar of such a shape to allow compound to pass thereby until it engages said compound;
    (e) moving the plates one towards the other to a position where both plates contact the spacing means; and
    (f) curing the compound between said plates.

2. A method of sealing one end of a hollow spar for a helicopter rotor blade comprising the steps of:
    (a) inserting a first plate into said spar having an outer edge which snugly engages said spar;
    (b) preparing the side of the first plate and the area of the spar adjacent thereto to receive an uncured sealing compound;

(c) placing a predetermined amount of uncured sealing compound into said blade end;
(d) placing spacing means in said compound;
(e) placing a second plate in said spar until it engages said compound;
(f) moving the plates one towards the other to a position where both plates contact the spacing means; and
(g) curing the compound between said plates.

3. A method of sealing one end of a hollow spar for a helicopter rotor blade comprising the steps of:
(a) inserting a first plate into said spar having an outer edge which snugly engages said spar;
(b) preparing the side of the first plate and the area of the spar adjacent thereto to receive an uncured sealing compound;
(c) placing a predetermined amount of uncured sealing compound into said blade end;
(d) placing spacing means in said compound;
(e) placing a second plate in said spar until it engages said compound;
(f) moving the plates one towards the other to a position where the sealing compound has been squeezed from between the second plate and said spar and both plates contact the spacing means; and
(g) curing the compound between said plates.

4. A method of sealing one end of a hollow spar for a helicopter rotor blade comprising the steps of:
(a) inserting a first plate into said spar having an outer edge which snugly engages said spar;
(b) heating the area of the spar which is to receive the uncured sealing compound;
(c) placing a predetermined amount of uncured sealing compound into said blade end;
(d) placing spacing means in said compound;
(e) placing a second plate in said spar until it engages said compound;
(f) drawing the plates toward each other to a position where both plates contact the spacing means; and
(g) curing the compound between said plates.

5. A method of sealing one end of a hollow spar for a helicopter rotor blade comprising the steps of:
(a) inserting a first plate into said spar having an outer edge which snugly engages said spar;
(b) heating the area of the spar which is to receive the uncured sealing compound;
(c) placing a predetermined amount of uncured sealing compound into said blade end;
(d) placing spacing means in said compound;
(e) letting compound set to permit entrapped air to escape;
(f) placing a second plate in said spar until it engages said compound;
(g) drawing the plates toward each other to a position where both plates contact the spacing means; and
(h) curing the compound between said plates.

6. A method of sealing one end of a hollow spar for a helicopter rotor blade comprising the steps of:
(a) selecting an inboard plate for said spar having an outer edge which will snugly engage said spar;
(b) cleaning the plate and spar surface where the seal is to be located;
(c) placing said inboard plate in said spar in its proper location;
(d) placing a predetermined amount of uncured sealing compound into said blade end;
(e) heating the area of the spar around the compound;
(f) placing spacing means in said compound;
(g) selecting an outboard plate having an outside contour slightly less than the inside contour of the spar;
(h) placing said outboard plate in said spar until it engages said compound;
(i) drawing the plates toward each other to a position where both plates contact the spacing means squeezing compound from between said plates around the periphery of the outboard plate; and
(j) curing the compound between said plate.

7. A method of sealing one end of a hollow spar for a helicopter rotor blade comprising:
(a) selecting a plate for the tip end of the spar having an outside contour slightly less than the inside contour of the spar;
(b) fixing a bead of material around the entire edge of said plate of a thickness greater than the difference between the inside contour of the spar and the outside contour of the plate;
(c) cleaning the spar cavity around the area to be sealed and the plate to receive a sealing compound;
(d) placing the plate in the spar keeping it parallel to a chord line of said spar;
(e) placing an uncured sealing compound in said spar;
(f) selecting a plate having an outside contour slightly less than the inside contour of the spar;
(g) placing said second plate in said spar keeping it parallel to a chord line of said spar;
(h) fixing said plates a predetermined distance apart; and
(i) curing said compound.

8. A method of sealing one end of a hollow spar for a helicopter rotor blade comprising:
(a) selecting a plate for the tip end of the spar having an outside contour slightly less than the inside contour of the spar;
(b) fixing a bead of material around the entire edge of said plate of a thickness greater than the difference between the inside contour of the spar and the outside contour of the plate;
(c) cleaning the spar cavity around the area to be sealed and the plate to receive a sealing compound;
(d) placing the plate in the spar keeping it parallel to a chord line of said spar;
(e) placing an uncured sealing compound in said spar;
(f) heating said spar around said compound so that the compound can be easily worked;
(g) selecting a plate having an outside contour slightly less than the inside contour of the spar;
(h) placing said second plate in said spar keeping it parallel to a chord line of said spar;
(i) fixing said plates a predetermined distance apart; and
(j) curing said compound.

9. A method of sealing one end of a hollow spar for a helicopter rotor blade comprising:
(a) selecting a plate for the tip end of the spar having an outside contour slightly less than the inside contour of the spar;
(b) fixing a bead of material around the entire edge of said plate of a thickness greater than the difference between the inside contour of the spar and the outside contour of the plate so that the plate and bead will have a snug fit with said spar;
(c) placing the plate in the spar at a predetermined location keeping it parallel to a chlordine of said spar;
(d) cleaning the spar cavity around the area to be sealed and the plate to receive a sealing compound;
(e) placing an uncured sealing compound in said spar;
(f) permitting any air trapped in said compound to escape;
(g) selecting a plate having an outside contour slightly less than the inside contour of the spar;
(h) placing said second plate in said spar against said compound keeping it parallel to a chordline of said spar;
(i) fixing said plates a predetermined distance apart so that compound is squeezed between said outer periphery and spar; and (j) curing said compound.

10. A method of sealing one end of a hollow spar for a helicopter rotor blade comprising:
    (a) selecting a plate for the tip end of the spar having an outside contour slightly less than the inside contour of the spar;
    (b) fixing a bead of material around the entire edge of said plate of a thickness greater than the difference between the inside contour of the spar and the outside contour of the plate so that the plate and bead will have a snug fit with said spar;
    (c) cleaning the spar cavity around the area to be sealed and the plate to receive a sealing compound;
    (d) placing the plate in the spar at a predetermined location keeping it parallel to a chordline of said spar;
    (e) placing an uncured sealing compound in said spar;
    (f) selecting a plate having an outside contour slightly less than the inside contour of the spar;
    (g) placing said second plate in said spar against said compound keeping it parallel to a chordline of said spar;
    (h) fixing said plates a predetermined distance apart so that compound is squeezed between said outer periphery and spar; and
    (i) curing said compound.

11. A method of sealing one end of a hollow spar for a helicopter rotor blade comprising the steps of:
    (a) inserting a first plate into said spar having an outer edge which snugly engages said spar;
    (b) placing a predetermined amount of uncured sealing compound into said blade end;
    (c) placing a second plate in said spar of such a shape to allow compound to pass thereby until it engages said compound;
    (d) moving the plates one towards the other until they are properly spaced apart; and
    (e) curing the compound between said plates.

12. A method of sealing one end of a hollow spar for a helicopter rotor blade comprising:
    (a) selecting a plate for the interior of the spar having an outside contour slightly less than the inside contour of the spar;
    (b) fixing a bead of elastomeric material around the entire edge of said plate of a thickness greater than the difference between the inside contour of the spar and the outside contour of the plate so that the bead is snugly fit against the spar when inserted;
    (c) cleaning the spar cavity around the area to be sealed and the plate to receive a sealing compound;
    (d) placing the plate in the spar in position keeping it parallel to a chordline of said spar;
    (e) heating the spar adjacent the plate;
    (f) placing an uncured sealing compound in said spar;
    (g) placing spacing means in said compound;
    (h) selecting a plate having an outside contour slightly less than the inside contour of the spar;
    (i) placing said second plate in said spar keeping it parallel to a chordline of said spar against the compound;
    (j) moving said second plate with relation to said first plate until the spacing means is engaged by both plates; and
    (k) curing said compound.

13. A method of sealing one end of a hollow spar for a helicopter rotor blade comprising:
    (a) selecting a plate for the interior of the spar having an outside contour slightly less than the inside contour of the spar;
    (b) fixing a bead of elastomeric material around the entire edge of said plate of a thickness greater than the difference between the inside contour of the spar and the outside contour of the plate;
    (c) coating the spar cavity around the area to be sealed and the plate with a primer to receive a sealing compound;
    (d) drying said primer;
    (e) placing the plate in the spar keeping it parallel to a chordline of said spar;
    (f) placing an uncured sealing compound in said spar;
    (g) selecting a plate having an outside contour slightly less than the inside contour of the spar;
    (h) placing said second plate in said spar against the compound keeping it parallel to a chordline of said spar;
    (i) fixing said plates a predetermined distance apart; and
    (j) curing said compound.

14. A method of sealing one end of a hollow spar for a helicopter rotor blade comprising:
    (a) selecting a plate for the interior of the spar having an outside contour slightly less than the inside contour of the spar;
    (b) fixing a bead of elastomeric material around the entire edge of said plate of a thickness greater than the difference between the inside contour of the spar and the outside contour of the plate;
    (c) coating the spar cavity around the area to be sealed and the plate with a primer to receive a sealing compound;
    (d) drying said primer;
    (e) placing the plate in the spar keeping it parallel to a chordline of said spar;
    (f) placing an uncured sealing compound EC-2181 B/A in said spar;
    (g) selecting a plate having an outside contour slightly less than the inside contour of the spar;
    (h) placing said second plate in said spar against the compound keeping it parallel to a chordline of said spar;
    (i) fixing said plates a predetermined distance apart; and
    (j) curing said compound until it has a durometer reading of approximately 45.

15. A method of sealing one end of a hollow spar for a helicopter rotor blade comprising:
    (a) selecting a plate for the tip end of the spar having an outside contour slightly less than the inside contour of the spar;
    (b) fixing a bead of resilient material around the entire edge of said plate of a thickness greater than the difference between the inside contour of the spar and the outside contour of the plate;
    (c) coating the spar cavity around the area to be sealed and the plate to receive a sealing compound with a primer EC-1945 B/A;
    (d) locating the plate in the spar keeping it parallel to a chordline of said spar;
    (e) placing an uncured sealing compound EC-2181 B/A in said spar;
    (f) heating said spar around said compound so that the compound can be easily worked;
    (g) selecting a plate having an outside contour slightly less than the inside contour of the spar;
    (h) placing said second plate in said spar against said compound keeping it parallel to a chordline of said spar;
    (i) fixing said plates a predetermined distance apart; and
    (j) curing said compound.

16. A method of sealing one end of a hollow spar for a helicopter rotor blade comprising:
    (a) selecting a plate for the interior of the spar having a snug fit against the spar when inserted;
    (b) cleaning the spar cavity around the area to be sealed and the plate;
    (c) coating the spar cavity around the area to be sealed and the plate to receive a sealing compound with a primer;

(d) drying the primer;
(e) positioning the plate in the spar in position keeping it parallel to a chordline of said spar;
(f) heating the spar adjacent the plate;
(g) placing an uncured sealing compound in said spar;
(h) permitting entrapped air to escape from said compound;
(i) placing spacing means in said compound;
(j) selecting a plate having an outside contour slightly less than the inside contour of the spar;
(k) placing said second plate in said spar keeping it parallel to a chordline of said spar against the compound;
(l) moving said second plate with relation to said first plate until the spacing means is engaged by both plates; and
(m) curing said compound.

17. A method of sealing one end of a hollow spar for a helicopter rotor blade comprising:
(a) selecting a plate for the interior of the spar having a bead of resilient material around the entire edge so that the bead is snugly fit against the spar when inserted;
(b) coating the spar cavity around the area to be sealed and the plate with a two part primer having a base and an accelerator to receive a sealing compound;
(c) drying said primer;
(d) positioning the plate in the spark keeping it parallel to a chordline of said spar;
(e) placing an uncured two part sealing compound having a base and an accelerator in said spar;
(f) selecting a plate having an outside contour slightly less than the inside contour of the spar;
(g) placing said second plate in said spar against the compound keeping it parallel to a chordline of said spar;
(h) fixing said plates a predetermined distance apart; and
(i) curing said compound to obtain the proper strength to withstand an operating pressure against either of said plates.

18. A method of sealing one end of a hollow spar for a helicopter rotor blade comprising the steps of:
(a) inserting a first plate into said spar having an outer edge which snugly engages said spar;
(b) placing a predetermined amount of uncured sealing compound into said blade end;
(c) placing a second plate in said spar of such a shape to allow compound to pass thereby until it engages said compound;
(d) moving the plates one towards the other until they are properly spaced apart; and
(e) curing the compound between said plates until it has a durometer reading of approximately 45.

No references cited.